United States Patent

Kassabgi et al.

[15] 3,657,527

[45] Apr. 18, 1972

[54] SYSTEM FOR AUTOMATICALLY CHECKING BOARDS BEARING INTEGRATED CIRCUITS

[72] Inventors: Georges Kassabgi; Mario Vinsani, both of Milan, Italy

[73] Assignee: Honeywell Information Systems Italia S.p.A.

[22] Filed: Oct. 16, 1969

[21] Appl. No.: 866,804

[30] Foreign Application Priority Data

Oct. 17, 1968 Italy ....................22592 A/68

[52] U.S. Cl. ....................235/153, 324/73 PC

[51] Int. Cl. ....................G06f 11/00, G01r 15/12

[58] Field of Search ....................235/153, 61.11, 153, 161.11; 324/73 PC, 73; 200/46

[56] References Cited

UNITED STATES PATENTS

| | | | |
|---|---|---|---|
| 2,887,622 | 5/1959 | Rayburn | 324/73 |
| 3,143,702 | 8/1964 | Kohler et al. | 324/73 |
| 3,243,532 | 3/1966 | Bonduwe | 200/46 |
| 3,497,685 | 2/1970 | Stafford | 235/153 |
| 3,527,406 | 8/1970 | Snellman | 200/46 X |
| 3,302,109 | 1/1967 | Jones | 324/73 |

*Primary Examiner*—Malcolm A. Morrison
*Assistant Examiner*—David H. Malzahn
*Attorney*—George V. Eltgroth, Lewis P. Elbinger and Frank L. Neuhauser

[57] ABSTRACT

A system for checking boards bearing integrated circuits, wherein a program card is read automatically to provide both test input signals to the board and simulation output signals representative of the correct output signals which should be delivered by the board in response to the test input signals, and wherein the actual output signals delivered by the board are compared with the simulation output signals for generating indicia representing any defects which may exist in the board.

4 Claims, 15 Drawing Figures

INVENTORS
Georges KASSABGI and Mario VINSANI by ATTORNEY

INVENTORS
Georges KASSABGI and Mario VINSANI

INVENTORS
Georges KASSABGI and Mario VINSANI

INVENTORS
Georges KASSABGI and Mario VINSANI

INVENTORS
Georges KASSABGI and Mario VINSANI

INVENTORS
Georges KASSABGI and Mario VINSANI

INVENTORS
Georges KASSABGI and Mario VINSANI

SYSTEM FOR AUTOMATICALLY CHECKING BOARDS BEARING INTEGRATED CIRCUITS

BACKGROUND OF THE INVENTION

This invention relates to a system for automatically testing digital electronic circuit assemblies and more particularly to apparatus for checking boards bearing integrated circuits, such as are used in electronic data processing systems.

Modern electronic equipments, and in particular those used for data processing, comprise a very large number of printed circuit boards on which separate electronic components or integrated circuit units are mounted. The circuits borne by these boards are most often of the binary digital type, operating on electrical signals which are permitted to have only two discrete values. Such boards are connected to the remainder of the data processing system and to other boards by multiple pin and plug connectors, so that they can be easily removed and replaced.

In the event of faulty operation of the electronic data processing systems it has previously been generally possible, by the use of known diagnostic means, to locate the board or the group of boards which contain the defect. In the older data processing systems, each board carried a limited number of discrete circuit components, such as diodes, transistors, etc., and therefore it was relatively simple, after removing and replacing the defective boards, to check the removed board and identify the defective components.

However, in the case of systems fabricated according to the most modern techniques, each board carries a relatively high number (10, 20 or more) of integrated circuit units, each circuit unit in turn comprising a considerable number of elementary circuits in various combinations. For such boards, the task of locating a defective circuit unit is quite difficult, and the search for a particular defect on the modern circuit board, if made by the diagnostic means employed with prior art data processing systems, generally would be very tedious and time consuming.

Accordingly, it is the principal object of the present invention to provide apparatus for automatically testing electronic equipment.

Another object of the invention is to provide a system for automatically evaluating the operation of a digital electronic circuit.

Another object of the invention is to provide a system for automatically testing the operation of boards bearing integrated circuits.

Another object of the invention is to provide a system for automatically testing the operation of boards bearing a plurality of integrated circuits and for identifying the defects, if any, in such boards.

SUMMARY OF INVENTION

The foregoing objects are achieved according to the instant invention by providing a mechanical and electronic system adapted to supply a predetermined sequence of sets of test input signals for the board to be tested and simulation output signals representative of the correct output signals which should be delivered by the board in response to the test input signals, and to compare the consequent pattern of output signals from the board with the simulation output signals. The sequence of sets of test input signals and simulation output signals are represented on a program card which moves through a series of positions relative to a reading device, such that in each reading position both a set of test input signals and the corresponding simulation output signals are read at the same time. The test input signals of the set are applied to the input terminals of the board under test. The corresponding simulation output signals are compared with the actual output signals delivered by the board. The results of the comparisons are evaluated and a visual display provided to indicate which defects, if any, are present on the board.

BRIEF DESCRIPTION OF THE DRAWINGS

The invention will be described with reference to the accompanying drawings, wherein.

DESCRIPTION OF PREFERRED EMBODIMENT

In the disclosed embodiment of the instant invention integrated circuit units of the type commonly designated as TTL (transistor — transistor logic) circuits are employed. These integrated circuit units comprise both normal transistors (transistors with but one emitter) and multiemitter transistors. A description of TTL circuits is provided in the article "First Design Details: Transistor — Transistor Logic Circuits" by H. W. Ruegg, *Electronics*, March 22, 1963. The employment of multiemitter transistors in TTL circuits is described in the article "Logic Principles for Multiemitter Transistors" by P. M. Thompson, *Electronics*, Sept. 13, 1963.

The integrated circuits which comprise the instant invention will now be described briefly.

Figure 1:
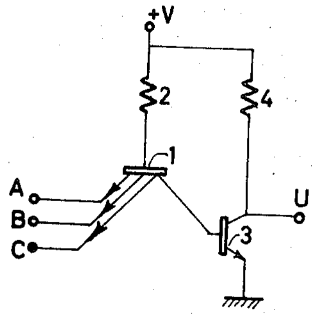
FIG. 1 is a schematic diagram of an integrated circuit unit which performs the NAND function.
Figure 1A:
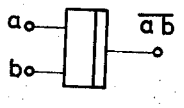
FIGS. 1*a* and 1*b* illustrate the symbols used herein for representing the NAND circuit in the respective instances of two inputs and of one input.
Figure 1B:
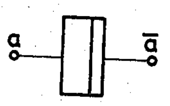

The logical circuit of FIG. 1 provides the NAND function and comprises a multiemitter transistor 1 and a normal transistor 3. Multiemitter transistor 1 is provided with three emitters, to which are connected the respective input leads A, B and C. A positive voltage source, +V is connected to the base transistor 1 through a resistor 2 and to the collector of transistor 3 through a resistor 4. The collector of transistor 1 is connected directly to the base of transistor 3. The emitter of transistor 3 is connected to a source of voltage which is negative relative to the +V source, such as ground. An output lead U is also connected to the collector of transistor 3.

In the circuit of FIG. 1, and in the circuits to follow, the binary value 1 is represented by a positive voltage such as +3v, which is the value of the +V source. The binary value 0 is represented by a voltage of the ground, for example 0v.

In the operation of the circuit of FIG. 1, if any one of the emitters of transistor 1 receives a binary 0 signal (is at ground potential), current flows through resistor 2 and the grounded emitter, thereby holding the base of transistor 1 at substantially ground potential. This maintains the connected transistor 3 non-conductive, so that no current flows through resistor 4 and the output lead U is at +3v, representing a binary 1.

If, however, all of the emitters of transistor 1 receive binary 1 signals (each is at +3v), no current flows through any of the emitters of transistor 1, thereby permitting the base of transistor 1 to operate at a voltage substantially positive relative to ground. This causes current to flow from base to emitter of transistor 3, and transistor 3 become conductive. Thus, current flows through resistor 4 and the collector of transistor 3, so that the output lead U is substantially at ground potential, representing a binary 0.

If the logical values of the signals on input leads A, B and C are represented by the respective binary variables $a$, $b$, $c$, and the logical value of the signal on output lead U is represented by the binary variable $u$, the logical function performed the circuit of FIG. 1 is represented by the Boolean, or logical, algebra expression $$u = \overline{abc}$$

which expression represents the logical NAND function.

The symbol of FIG. 1$a$ is employed herein for representing a NAND logical circuit having two input leads. The symbol of FIG. 1$b$ represents a NAND logical circuit having one input lead. The latter circuit performs the inversion, or NOT, logical function.

Figure 2:
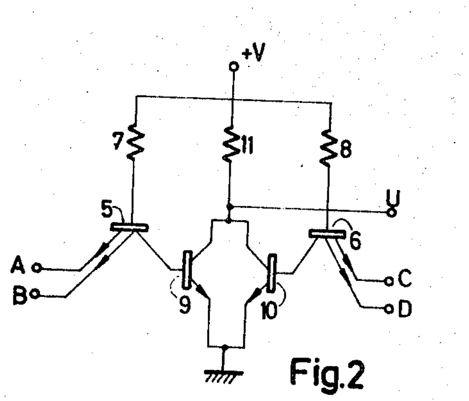
FIG. 2 is a schematic diagram of an integrated circuit unit which performs the AND-OR-NOT function.
Figure 2A:
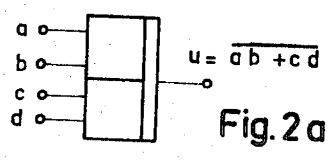
FIGS. 2*a* and 2*b* illustrate the symbols used herein for representing the AND-OR-NOT circuit in respective instances of four inputs and of two inputs.
Figure 2B:
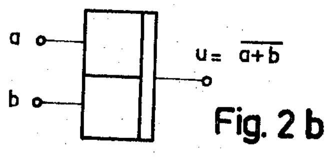

The logical circuit of FIG. 2 provides the AND-OR-NOT logical function and comprises the multiemitter transistors 5 and 6 and the normal transistors 9 and 10. Multiemitter transistor 5 is provided with a pair of emitters, to which are connected the respective input leads A and B. Multiemitter transistor 6 is also provided with a pair of emitters, to which are connected the respective input leads C and D. A positive voltage source, +V, is connected to the base of transistor 5 through a resistor 7, to the base of transistor 6 through a resistor 8, and to the commonly connected collectors of transistors 9 and 10 through a resistor 11. The collector of transistor 5 is connected to the base of transistor 9 and the collector of transistor 6 is connected to the base of transistor 10. The emitters of transistors 9 and 10 are connected to a source of voltage which is negative relative to the +VB source, such as ground. An output lead U is also connected to the commonly connected collectors of transistors 9 and 10.

From the previous description of the operation of the circuit of FIG. 1, it follows that the logical value of the signal delivered by transistor 5 to the base of transistor 9 represents the AND function for the signals on input leads A and B of transistor 5. Similarly, the logical value of the signal delivered by transistor 6 to the base of transistor 10 represents the AND function for the signals on input leads C and D of transistor 6. If either signal delivered to the base of transistor 9 or transistor 10 represents a binary 1, the output signal on lead U represents a binary 0. Only if both base signals represent binary 0's does the output signal represent a binary 1. Thus the pair of transistors 9 and 10 provides the NOR function for the pair of signals delivered to their bases. Accordingly, if the logical values of the signals signals on input leads A, B, C and D of the circuit of FIG. 2 are represented by the respective binary variables $a$, $b$, $c$ and $d$, and the logical value of the signal on output lead U is represented by the binary variable $u$, the logical function performed by the circuit of FIG. 2 is represented by the logical algebra expression $$u = \overline{ab + cd}$$

The symbol of FIG. 2$a$ is employed hereinafter for representing an AND-OR-NOT logical circuit having a pair of input leads connected to each of its two multiemitter transistors. The symbol of FIG. 2$b$ represents an AND-OR-NOT logical circuit having but one input lead connected to each of the multiemitter transistors. The latter logical circuit performs the simpler NOR logical function.

The different circuits used in the invention which will now be described, are formed by combinations of the integrated circuit units of FIGS. 1 and 2. However, modifications of and additions to these circuits may be provided to obtain greater amplification, sensitivity, speed and reliability of operation.

Figure 3:
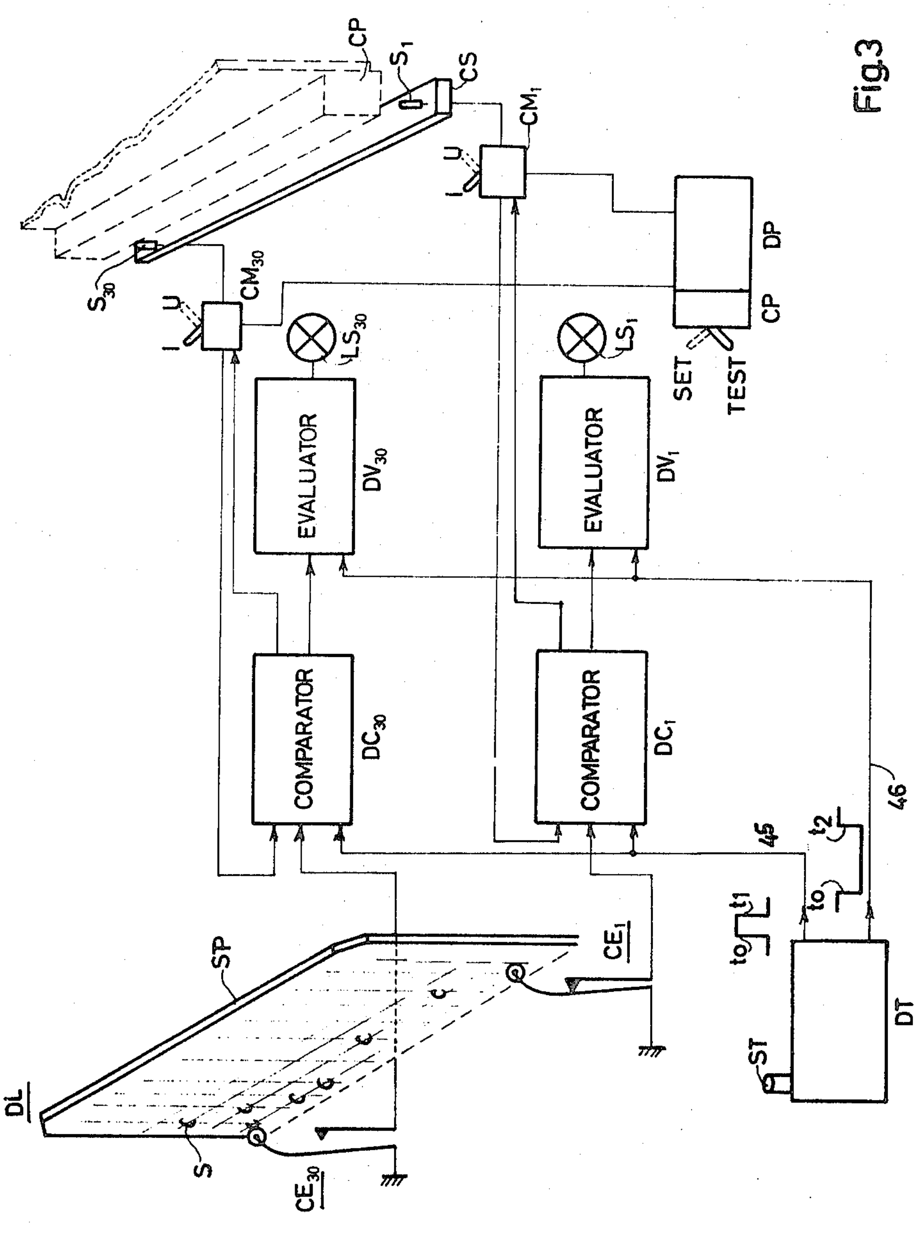
FIG. 3 is a symbolic block diagram of an embodiment of the invention.

The testing system of FIG. 3 is adapted to test and evaluate integrated circuit boards having a plurality of input and output terminals, one such board being represented by the dashed lines in the upper right portion of the figure. The testing system is controlled by a program card SP, which contains both representations of the test input signals to be applied to the particular board under test and representations of the simulation output signals to be expected from a properly operating board. The system comprises a reading station, designated generally by the reference symbol DL, for reading the signal representations on the program card and for delivering corresponding electrical signals; a plurality of comparators, each comparator being designated by the general reference symbol $DC_i$, for comparing the actual output signals delivered by the board under test with the simulation output signals provided by the program card; and a plurality of evaluators, each evaluator being designated by the general reference symbol $DV_i$, for evaluating the signals delivered by the comparators and for controlling a plurality of test lamps. Each test lamp is designated by the general reference symbol $LS_i$, and the plurality of test lamps represent the state of the board being tested. The system also comprises a timer DT for controlling the sequence of operations carried out by the system; a set of switches, each switch being designated by the general reference symbol $CM_i$, for enabling the system to treat each of the terminals of the board under test as either an input or an output point; and a connector CS for connecting the test system to the board under test.

The operation of the system of FIG. 3 will now be described. In the particular embodiment illustrated the boards to be tested are provided with 30 terminals by way of example, although the system can test a board with any number of terminals by varying the number of comparators and evaluators which participate in the test operation.

Each board to be tested is provided with a plurality of input terminals and a plurality of output terminals. In accordance with the principles of the instant invention, the particular arrangement of input and output terminals need not be fixed. Each of 30 switches $CM_1$ – $CM_{30}$ is associated with a corresponding one of the terminals of the board under test. The switches $CM_i$ enable the system to operate, without changing connection, with either an input terminal or an output terminal at each position of the board under test. A switch $CM_i$ is placed in the I position when the corresponding board terminal is an input terminal and must receive a test input signal from the system. The switch $CM_i$ is placed in the U position when the corresponding board terminal is an output terminal and the system must receive an output signal from the board. In the instant embodiment the switches $CM_i$ are manually operable, although it is within the scope of the instant invention that such switches be controlled automatically.

Accordingly, when a new board is to be tested by the system of FIG. 3, the connector CS is attached to the board. Each of the thirty pins $S_1$ – $S_{30}$ of the connector engages a corresponding terminal of the board under test. Each of the switches $CM_1$ – $CM_{30}$ is then set to either its I or U position, according to whether the corresponding board terminal is an input or an output terminal.

Program card SP is preferably substantially rigid and rectangular in shape, such as a plate formed of aluminum. The program card is supported for vertical step-by-step movement relative to reading station DL. The program card carries representations of the test input signals and simulation output signals to be used by the system of FIG. 3. These representations comprise, in the instant embodiment, a plurality of prominences S, the prominences being selectively disposed at the intersections of the rows and columns of a geometrical matrix on the program card. The presence of a prominence at any intersection of a row and column of the matrix represents a binary 1 and the absence of a prominence at any intersection represents a binary 0. In the embodiment of FIG. 3, card SP is provided with 30 columns in the matrix representation, one column for each terminal of the board under test. Each row in the matrix representation contains representations for all required test input signals and the corresponding simulation output signals for a complete step in the test operation. It is understood of course that a program card usable with the instant invention need not be in form as described, but may comprise other material and forms of signal representations, such as sets of round or rectangular holes in a card or set of contacts on an insulated plate.

Reading station DL is provided for reading the signal representations borne by the program card. The reading station comprises a row of reading contacts $CE_1 - CE_{30}$, one for each column of the program card. Each of contacts $CE_i$ is so disposed relative to the program card that a prominence on the associated column will open such contact, but if a prominence is absent, the contact will not be opened. Accordingly, the state of the contacts corresponds to the binary representations of the prominences so that an open contact $CE_i$ represents a binary 1 and a closed contact a binary 0 when a row of information on card SP is opposite the reading station row of reading contacts.

A plurality of comparators $DC_1 - DC_{30}$ is provided, one for each terminal of the board under test. Each comparator $DC_i$ is connected to one lead of a respective one of contacts $CE_i$, the other lead of each contact being grounded. Each comparator is also selectively connected through one of switches $CM_i$ to a corresponding terminal of the board under test. If such corresponding terminal is an output terminal, and the respective switch $CM_i$ is placed in the U position, the comparator is thereby connected to receive the signal delivered by such output terminal and to compare this signal with the simulation output signal delivered by the corresponding one of contacts $CE_i$. A comparator delivers an output signal representing a binary 0 if the two signals compared are alike, else its output signal represents a binary 1.

A plurality of evaluators $DV_1 - DV_{30}$ is provided, one for each comparator. Each evaluator $DV_i$ receives the output signal delivered by the corresponding comparator $DC_i$ and, after a predetermined time following a test made by such comparator, delivers an output signal to control a corresponding one of lamps $LS_1 - LS_{30}$. For each comparator delivering a binary 1 output signal, indicating a disagreement between the output signal delivered by the board and the simulation output signal, the corresponding evaluator $DV_i$ turns on the corresponding lamp $LS_i$. Thus, the set of lamps $LS_i - LS_{30}$ provides a representation of the errors on the board for each step in the test operation as the program card is advanced row-by-row through reading station DL. If no lamp lights during the entire reading of a program card, there are no detectable errors on the board.

The timer DT is connected to the comparators and evaluators to control the sequence of operations required during the test step provided by each row of representations on the program card. When a test key ST is operated, the timer transmits control signals in timed order to the comparators and the evaluators, thereby controlling the system to apply the test input signals to the board under test, to receive the consequent output signals from the board, and to make the necessary comparisons and evaluation.

Accordingly, in the system of FIG. 3, a program card containing representations of test input signals and corresponding simulation output signals in discrete rows thereon, each row representing a separate test step for a circuit board, is scanned by a reading station. For each row on the program card, the input test signals are applied to the board under test and the consequent output signals are received from the board and compared with the simulation output signals. From the comparisons, lamps are lit if defects are detected. The pattern of the lighted lamps for each row on the program card relates to particular defects on the circuit board. By having a prepared list of the defect which corresponds to each different pattern of lamps, locating a particular defective circuit unit becomes precise, simple and accurate.

The system of FIG. 3 will now be described in greater detail, accompanied by a more detailed description of the operation of the invention.

Figures 4, 5:
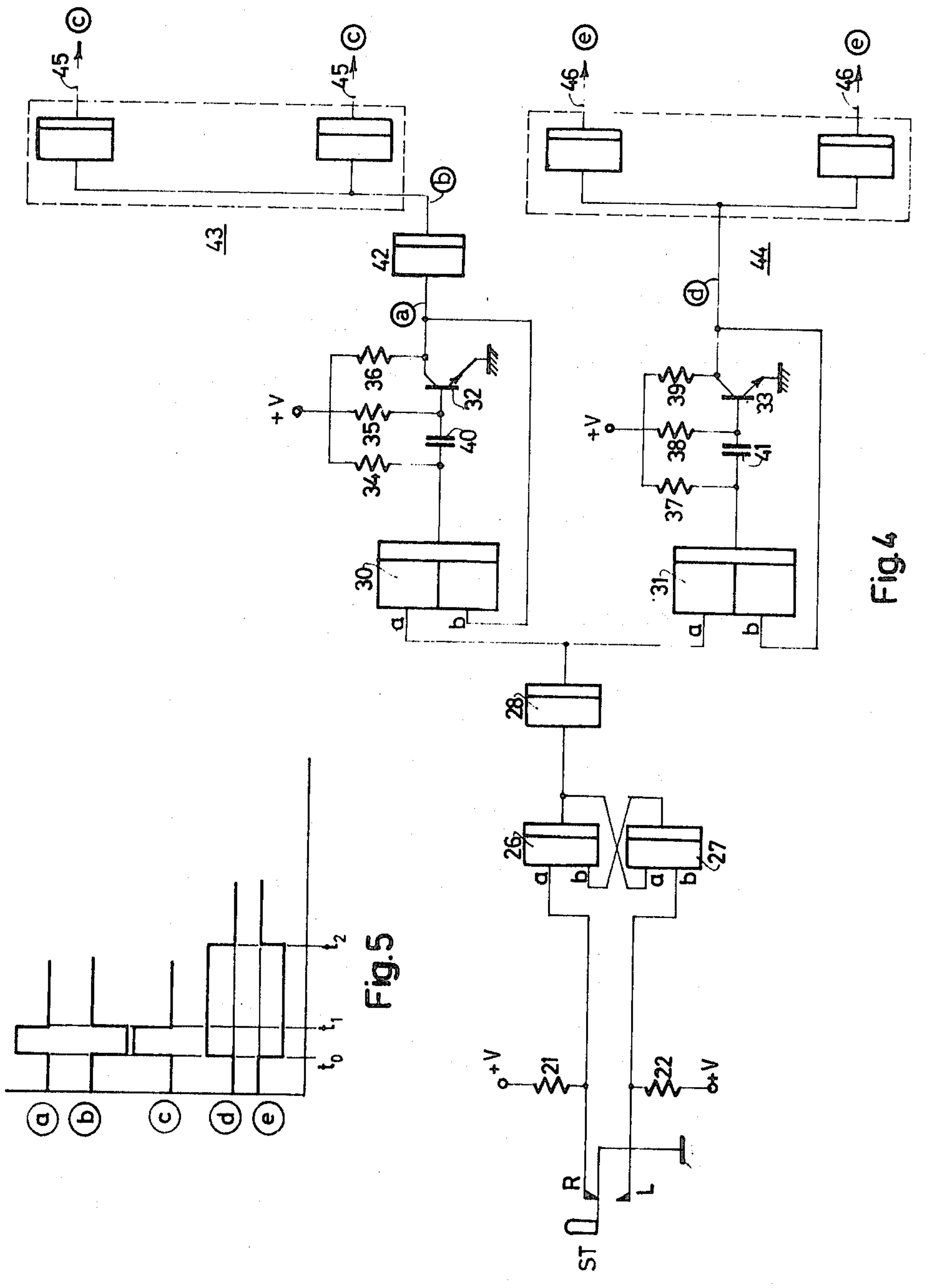
FIG. 4 is a block diagram of the timer of FIG. 3.
FIG. 5 illustrates signal waveshapes which occur at different points in the timer.

Timer DT, FIG. 4, generates a pair of signals for controlling the sequence of operations of the testing system. In the instant embodiment each time key ST is depressed, a 200 ns, binary 1, pulse is generated for enabling operation of the comparators and a 600 ns, binary 0, pulse is generated for disabling the evaluators.

The timer comprises a test key ST for initiating each test step in the system; a flip-flop, comprising the cross-coupled NAND circuits 26 and 27, for storing a representation of the position of key ST; a NOT circuit 28 for inverting the binary sense of the signal delivered by the flip-flop; a one-shot, comprising the interconnected NOR circuit 30 and transistor 32, for generating a 200 ns pulse; a one-shot, comprising the interconnected NOR circuit 31 and transistor 33, for generating a 600 ns pulse; a NOT circuit 42 for inverting the binary sense of the 200 ns pulse; a set 43 of parallel-connected NOT circuits, employed as amplifiers, for delivering the 200 ns pulse to the comparators; and a set 44 of parallel-connected inverters, employed as amplifiers, for delivering the 600 ns pulse to the evaluators.

The quiescent, or rest state of the timer will now be described. At this time the central contact of key ST, which is connected to ground, is in its upper position against fixed contact R, thereby applying a binary 0 signal through contact R to input lead a of NAND circuit 26. At the same time the fixed contact L, which is connected to a positive voltage source, +V, through a resistor 22, is applying a binary 1 signal to input lead b of NAND circuit 27. The binary 0 signal applied to its input lead a controls NAND circuit 26 to deliver a binary 1 output signal, which is coupled to input lead a of NAND circuit 27. Since both input signals received by NAND circuit 27 represent binary 1's, the circuit delivers a binary 0 signal. The binary 0 output signal delivered by NAND circuit 27 is applied, in turn, to input lead b of NAND circuit 26, thereby maintaining stable operation of the flip-flop.

The binary 1 output signal delivered by the timer flip-flop is coupled to NOT circuit 28, which responds to deliver an output signal representing a binary 0. The output signal delivered by NOT circuit 28 is applied to the input leads a of NOR circuits 30 and 31.

In the quiescent state transistor 32 is maintained conductive by current flowing from base to emitter thereof, which current is supplied by the positive voltage source, +V, through a resistor 35. This current flows through resistor 36 and the collector of transistor 32, maintaining the collector of transistor 32 at substantially Ov. This Ov signal on the collector of transistor 32 is the output signal of the one-shot comprising NOR circuit 30 and transistor 32. Each binary 0 output signal is coupled back to input lead b of NOR circuit 30. Since both input signals received by NOR circuit 30 represent binary 0's, the output signal delivered by the NOR circuit 30 represents a binary 1. Accordingly, in the quiescent state, wherein the flip-flop delivers a binary 0 output signal, the left-hand lead of capacitor 40 is maintained at the +3v level, because NOR circuit 30 is delivering a binary 1 output signal, and the right-hand lead is maintained substantially at the Ov level, because of the conduction of transistor 32. Therefore, capacitor 40 is charged to approximately 3v during the quiescent state of the timer.

Transistor 33 is similarly conductive in the quiescent state of the timer. The one-shot comprising NOR circuit 31 and transistor 33 delivers a binary 0 output signal, which is also coupled back to input lead *b* of NOR circuit 31, controlling NOR circuit 31 to deliver a binary 1 output signal. Thus, capacitor 41 is charged to 3v in the quiescent state.

The binary 0 output signal delivered by transistor 32 is applied to NOT circuit 42, which responds to deliver an output signal representing a binary 1. The output signal of NOT circuit 42 is applied to each of the NOT circuits of set 43. Each of the NOT circuits of set 43 inverts the sense of the binary 1 signal received thereby and transmits a binary 0 output signal on the respective output lead 45 thereof to a respective one of comparators $DC_1 - DC_{30}$. The binary 0 output signal delivered by transistor 33 is applied to each of the NOT circuits of set 44. Each of the NOT circuits of set 44 inverts the sense of the binary 0 signal received thereby and transmits a binary 1 output signal on the respective output lead 46 thereof to a respective on of comparators $DV_1 - DV_{30}$.

Accordingly, in the quiescent state of the timer, binary 0 output signals are delivered to each of the comparators and binary 1 output signals are delivered to each of the evaluators. The waveshapes illustrated in FIG. 5 represent the form of signals present at different points in the timer. The location in the timer for each such waveshape is designated in FIG. 4 by the corresponding waveshape symbol. Thus, waveshape *c* is delivered by output leads 45 and waveshape *e* is delivered by output leads 46. The quiescent period of operation of the timer is represented by the portion of the waveshapes to the left of time $t_0$ in FIG. 5.

When key ST is depressed, the timer enters an unstable condition, wherein it remains for 600 ns, which condition will be designated hereinafter as the "transient state." At the instant that the central contact of key ST leaves fixed contact R and has not yet arrived at fixed contact L, a binary 1 signal is applied from contact R to input lead a of NAND circuit 26. This momentary application of a binary 1 input signal to nand circuit 26 does not change the operation thereof, because input lead b continues to receive a binary 0 signal from NAND circuit 27. When the central contact of key ST reaches fixed contact L, it applies a binary 0 signal through contact L to input lead b of NAND circuit 27. This binary 0 signal controls NAND circuit 27 to change its output signal from a binary 0 to a binary 1. Since both input signals received by NAND circuit 26 represent binary 1's, the circuit delivers a binary 0 output signal.

NOT circuit 28 converts the binary 0 output signal delivered by NAND circuit 26 to a binary 1 signal. The binary 1 output signal delivered by NOT circuit 28 is transmitted to the input leads a of NOR circuits 30 and 31.

When NOR circuit 30 receives the binary 1 input signal, its output signal drops to Ov, representing a binary 0. This voltage fall on the output lead of NOR circuit 30 forces the left-hand lead of capacitor 40 to drop to Ov, and causes the right-hand lead of capacitor 40, which has a 3v charge, to drop to −3v. Thus, the base of transistor 32 is driven substantially negative and the transistor becomes non-conductive. The collector of transistor 32 immediately rises to +3v, so that the one-shot output signal represents a binary 1. This binary 1 output signal is coupled back to input lead b of NOR circuit 30, maintaining the output signal of NOR circuit 30 as a binary 0, independently of the binary value of the input signal applied to lead a thereof. Thus, the operation of the one-shot which comprises NOR circuit 30 is now isolated from the operation of key ST, so that the release of key ST has no effect during this period on the operation of the one-shot.

The time during which the output signal of transistor 32 continues to represent a binary 1 is determined by the time required for capacitor 40 to discharge and permit resumption of conduction by transistor 32. Capacitor 40 discharges through resistor 35, so that the base voltage of transistor 32 increases exponentially. The time-constant of this discharge is determined by the resistance of resistor 35 and the capacitance of capacitor 40. After a predetermined time interval, in the present example 200 ns, the base voltage of transistor 32 reaches a value which enables the transistor again to become conductive and its output signal to return once again to the binary 0 value.

The 200 ns positive pulse delivered by transistor 32, shown between the times $t_0$ and $t_1$ of waveshape *a*, is applied to NOT circuit 42. Circuit 42 inverts the binary sense of the pulse and delivers a negative pulse, shown in waveshape *b*, to each of the not circuits of set 43. Accordingly, each of the NOT circuits of set 43 transmits a 200 ns pulse representing a binary 1, waveshape *a*, to a respective one of the comparators.

When NOR circuit 31 receives the binary 1 input signal from NOT circuit 28, upon the depression of key ST, the one-shot comprising NOR circuit 31 and transistor 33 operates similarly to the previously described operation of the one-shot comprising NOR circuit 30 and transistor 32. However, in the one-shot with NOR circuit 31 the time constant determined by capacitor 41 and resistor 38 is substantially larger than that of capacitor 40 and resistor 35. Therefore, the positive pulse delivered by transistor 33 continues from time $t_0$ to $t_2$, as shown in waveshape d of FIG. 5, which in the instant embodiment is a duration of approximately 600 ns. The 600 ns positive pulse delivered by transistor 33 is applied directly to the NOT circuits of set 44. Accordingly, each of the NOT circuits of set 44 transmits a 600 ns pulse representing a binary 0, waveshape *e*, to a respective one of the evaluators.

Figure 6:
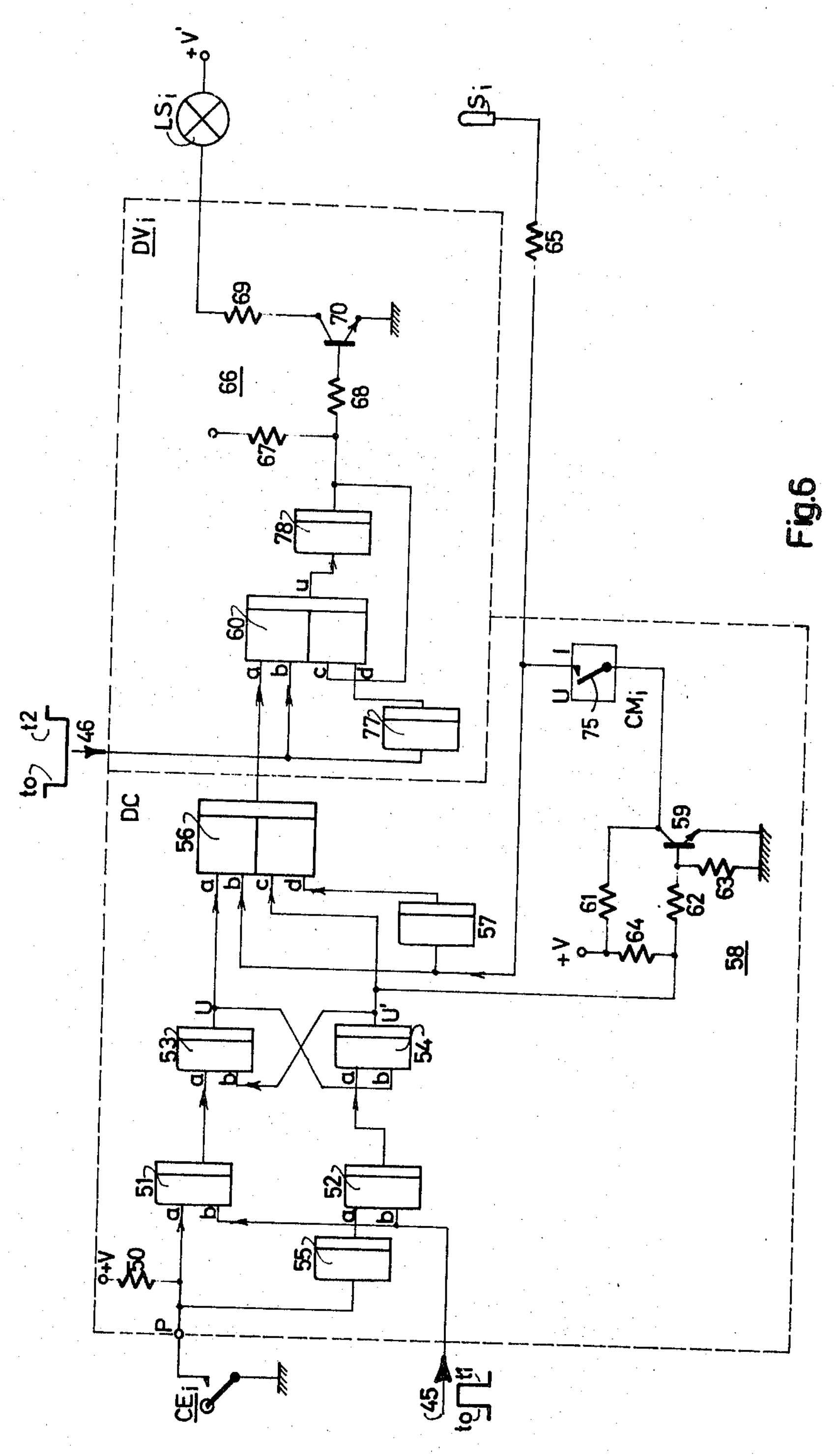
FIG. 6 is a block diagram of a comparator and associate evaluator of FIG. 3.

The interrelationship of a comparator $DC_i$, the associated evaluator, $DV_i$, the associated lamp $LS_i$, and the associated switch $CM_i$ is illustrated in FIG. 6. The comparator $DC_i$ comprises, generally, a memory circuit, which comprises NAND circuits 51, 52, 53 and 54 and a NOT circuit 55, for storing a representation of the position of contact $CE_i$; a comparing circuit, which comprises AND-OR-NOT circuit 56 and NOT circuit 57, for comparing a simulation output signal with the corresponding actual output signal; a pulse inverter amplifier designated generally by the reference numeral 58, which comprises the interconnected transistor 59 and resistors 61, 62, 63 and 64, for amplifying a signal transmitted to the corresponding pin $S_i$ when such pin connects to an input terminal of the board under test; and the associated switch $CM_i$ for controlling the operation of comparator $DC_i$ according to whether the corresponding terminal of the board under test is an input terminal, in which case switch $CM_i$ is set to the I position, or an output terminal, in which case switch $CM_i$ is set to the U position.

Contact $CE_i$ is open when the binary representation at the corresponding column of program card SP is a prominence (binary 1) and is closed when there is no prominence at the corresponding column (binary 0). The movable spring portion of contact $CE_i$ is connected to ground and the fixed portion of the contact is connected to the positive voltage source, +V, through a resistor 50. When contact $CE_i$ is closed, point P at the fixed portion of the contact is at Ov, representing a binary 0. When contact $CE_i$ is open, point P is at the positive +V level, representing a binary 1. Point P is connected to input lead a of NAND circuit 51 and to the input lead of NOT circuit 55. The output lead of NOT circuit 55 is connected to the input lead a of NAND circuit 52. Input leads b of NAND circuits 51 and 52 are both connected to one of the output leads 45 of the timer, FIG. 4. Thus, opposite binary values are applied to the input leads a of NAND circuits 51 and 52; that is, if contact $CE_i$ is open, a binary 1 is applied to NAND circuit 51 and a binary 0 to NAND circuit 52, whereas if contact $CE_i$ is closed, a binary 0 is applied to NAND circuit 51 and a binary 1 to NAND circuit 52.

The output leads of NAND circuits 51 and 52 are connected respectively to input leads a of NAND circuits 53 and 54. NAND circuits 53 and 54 are cross-coupled to form a flip-flop, as described in connection with the flip-flop of FIG. 4. The flip-flop is stable in each of two possible states. In one state the signal delivered by flip-flop output lead U represents a binary 1 and the signal delivered by output lead U' represents a binary 0, whereas in the other state output lead U delivers a binary 0 and lead U' a binary 1. Accordingly, the flip-flop of the comparator is adapted to store a binary value for an indefinite period.

In the quiescent state of the system, the period prior to time $t_0$ of FIG. 5, the binary 0 signals present on the output leads 45 of the timer and coupled to input leads b of NAND circuits 51 and 52 control both NAND circuits 51 and 52 to deliver binary 1 output signals. The consequent receipt of binary 1 signals at both input leads a of NAND circuits 53 and 54 of the flip-flop serve to hold the flip-flop in whatever state it is operating.

When the timer enters the transient state, NAND circuits 51 and 52 both receive a 200 ns binary 1 pulse of the input leads b thereof, such pulse enabling the memory circuit portion of comparator $DC_i$ to accept and store the status of the corresponding contact $CE_i$.

If contact $CE_i$ is open at this time, providing a binary 1 signal to input lead a of NAND circuit 51, the presence of binary 1 signals on both input leads of NAND circuit 51 controls it to deliver a binary 0 output signal with contact $CE_i$ open, NAND circuit 52 receives a binary 0 signal on input lead a and, therefore, delivers a binary 1 output signal. These two signals of opposite binary sense delivered by NAND circuits 51 and 52 to respective input leads a of NAND circuits 53 and 54 set the flip-flop to the stable state wherein a binary 1 signal is delivered on output lead U and a binary 0 signal on output lead U'.

Conversely, if contact $CE_i$ is closed when the binary 1 pulse is supplied on line 45, NAND circuit 52 receives a pair of binary 1 input signals and, therefore, is controlled to deliver a binary 0 output signal. Since NAND circuit 51 delivers a binary 1 output signal in this instance, the pair of signals of opposite binary sense delivered by NAND circuits 51 and 52 set the flip-flop to the stable state wherein output lead U delivers a binary 0 signal and output lead U' delivers a binary 1 signal.

Thus by the end of the 200 ns pulse provided by the timer, the flip-flop has stored the binary value represented by the position of the corresponding contact $CE_i$. Thus, the binary value of the signal delivered on output lead U is the same as that represented by the position of the contact $CE_i$, and the signal delivered on output lead U' has the opposite binary value.

Output leads U and U' are connected respectively to input leads *a* and *c* of the AND-OR-NOT circuit 56. The corresponding pin $S_i$ of connector CS, FIG. 3, is connected through a resistor 65 to input lead *b* of circuit 56 and to the input lead of NOT circuit 57. The output lead of NOT circuit 57 is connected, in turn, to input lead *d* of circuit 56.

If pin $S_i$ is connected to an output terminal of the board under test, the contact 75 of switch $CM_i$ is open (U position), so that the signal received by pin S is transmitted to input lead *b* of circuit 56. In this instance, the binary value of the signal delivered to lead b of circuit 56 depends on the pattern of test input signals transmitted to the board under test for this test step and, in addition, depends on whether the board is operating correctly or defectively. The inverted logical value of the output signal received by pin $S_i$ is transmitted to input lead d of circuit 56.

As described previously, the logical function represented by the output signal of AND-OR-NOT circuit 56 is expressed as:

$$u = \overline{ab + cd}$$

However, because $$c = \bar{a} \text{ and } \bar{d} = b$$

the logical function represented by the output signal of circuit 56 may be more simply expressed as:

$$u = \overline{ab + \bar{a}\bar{b}}$$

From this last expression, it can be deduced that the output signal of circuit 56 represents a binary 0 if the binary values of the signals applied to its input leads a and b are alike and represents a binary 1 if the signals are unlike.

Therefore, circuits 56 and 57 cooperatively function as a comparing circuit, comparing the binary values of the signals delivered by an output terminal of the board under test with the corresponding simulation output signal read from the program card by contact $CE_i$. If the actual board output signal has the same binary value as the corresponding simulation output signal, the output signal of circuit 56 represents a binary 0, but if the board output signal and the simulation output signal represent unlike binary values, circuit 56 delivers a binary 1 output signal. Generally, when the output signal of circuit 56 represents a binary 0 proper operation of the portion of the board being tested is denoted, whereas if such output signal represents a binary 1, defective operation of the board portion is denoted.

If pin $S_i$ is connected to an input terminal of the board under test, the contact 75 of switch $CM_i$ is closed (I position), so that the U' output signal of circuit 54 is transmitted through amplifier 58 to pin $S_i$ for application to the corresponding input terminal of the board. This U' output signal represents a logical value which is opposite to the logical value represented by the corresponding contact $CE_i$.

Amplifier 58 amplifies and inverts the logical sense of the U' signal received thereby. The emitter of transistor 59 is connected to ground and the collector of the transistor is connected to the +V source through resistor 61. A voltage divider comprising resistors 64, 62 and 63 in series is connected between the +V source and ground. Both the output lead of circuit 54 and the base of transistor 59 are connected to junction points of the voltage divider. When the output signal of circuit 54 represents a binary 0, the base of transistor 59 is maintained at substantially Ov, transistor 59 is held non-conductive, and the collector thereof operates at the +V level to represent a binary 1. When the output signal of transistor of circuit 54 represents a binary 1, the base of transistor 59 is maintained at a substantially positive voltage relative to ground, transistor 59 is held conductive, and the collector thereof operates substantially at Ov to represent a binary 0. Therefore, by providing a logical inversion of the output signal of circuit 54, amplifier 58 delivers to the input terminal of the board under test a signal having the same binary value as that represented by the corresponding column of the program card and by the signal delivered by the corresponding contact $CE_i$.

The output signal delivered by inverter-amplifier 58 is also transmitter to input lead b of circuit 56 and to NOT circuit 57. Therefore, when switch $CM_i$ is closed to represent a corresponding input terminal of the board under test, the binary values of the signals applied to input leads *a* and *b* of circuit 56 are always alike and the output signal delivered by circuit 56 represents a binary 0.

The board under test may contain circuits which operate in sequence or circuits which introduce an appreciable delay in their response to input signals. Therefore, the evaluation of the results of the application of test input signals to the board is not made immediately, but following a certain interval after applying the test input signal pattern to the board. This delay in evaluation allows the circuits on the board sufficient time to assume their steady-state conditions. Accordingly, in the instant invention the evaluation of the board under test for each test step provided by the program card occurs only following the determination of the 600 ns pulse generated by the timer.

Evaluator $DV_i$ comprises an AND-OR-NOT circuit 60; a pair of NOT circuits 77 and 78; and a control amplifier designated generally by the reference numeral 66, which comprises the interconnected resistors 67, 68 and 69 and a transistor 70, for controlling the operation of the corresponding lamp $LS_i$.

The lamp $LS_i$ is operated by the collector current of transistor 70, such current being drawn from the +V source through the series-connected lamp and resistor 69. When a binary 1 signal is applied to the input point of amplifier 66, i.e., the junction point of the series-connected resistors 67 and 68, transistor 70 is controlled to be conductive and lamp $LS_i$ is lighted. However, if a binary 0 signal is applied to the input point of the amplifier, transistor 70 is held non-conductive and the lamp is unlighted.

An output lead 46 of the timer, FIG. 4, is connected to input lead *b* of circuit 60 and to NOT circuit 77. The output signal of NOT circuit 77 is coupled to input lead *d* of circuit 60. The output signal of circuit 56, which is the output signal of the associated comparator, is coupled to input lead a of circuit 60. The signal delivered by circuit 60 on output lead u thereof is coupled to NOT circuit 78, and the output signal delivered by circuit 78 is applied to the input points of control amplifier 66 and is coupled back to input lead *c* of circuit 60.

The binary value of the signal on input lead *d* of circuit 60 is the logical inverse of the signal on input lead *b*. With this constraint, the permitted truth table for the AND-OR-NOT circuit 60, whose output signal is related to the four input signals by the logical expression $u = ab + cd$, comprises the eight following states:

| | a | b | c | d | u | | a | b | c | d | u |
|---|---|---|---|---|---|---|---|---|---|---|---|
| 1 | 0 | 0 | 0 | 1 | 1 | 5 | 1 | 0 | 0 | 1 | 1 |
| 2 | 0 | 0 | 1 | 1 | 0 | 6 | 1 | 0 | 1 | 1 | 0 |
| 3 | 0 | 1 | 0 | 0 | 1 | 7 | (1 | 1 | 0 | 0 | 0) |
| 4 | (0 | 1 | 1 | 0 | 1) | 8 | 1 | 1 | 1 | 0 | 0 |

However, the binary value of the signal on input lead *c* of circuit 60 is the logical inverse of the signal on output lead *u* of circuit 60 and, therefore, imposes a further restriction on the permitted states in the above truth table. Accordingly, states 4 and 7 are excluded by this further restriction, such exclusion being denoted by the parentheses in the truth table.

It has been described previously herein that if a binary 1 input signal is applied to amplifier 66, the lamp is lighted, but the lamp is not lighted when a binary 0 signal is applied. Since the input signal applied to amplifier 66 is the same as the signal which is applied to input lead *c* of circuit 60, the column designated "*c*" in the above truth table corresponds directly to the state of illumination of lamp $LS_i$.

From the truth table it can be deduced that when the signal on input lead *b* is a binary *O* (states 1, 2, 5, and 6 ), which occurs during the receipt of the 600 ns binary 0 pulse on lead 46 from the timer, the value of the output signal *c* is independent of the signal delivered to input lead a from the comparator. Thus, during the 600 ns pulse, the lighted condition of the lamp bears no relationship to the current response of the board under test to the test input signals. However, when the signal on input lead *b* returns to the binary 1 value, approximately 600 ns after the test input signal pattern is transmitted to the board under test, states 3 and 8 of the table demonstrate that the binary value of the signal on lead *c* is the same as the binary value of the signal received from the comparator on lead *a*. Therefore, after the evaluator $DV_i$ is enabled, lamp $LS_i$ is lighted if the output signal of comparator $DC_i$ represents a binary 1, which occurs when the binary value of the simulation output signal differs from that of the corresponding actual output signal delivered by the board under test. The lamp is extinguished however, if the output signal of the comparator represents a binary 0, which occurs when the simulation output signal has the same binary value as the corresponding actual output signal.

Accordingly, during each test step controlled by the program card, the lighting of at least one of lamps $LS_1$ – $LS_{30}$ denotes that the signals delivered from the output terminals of the board under test are not the ones which are to be expected from the test input signal pattern applied to the input terminals of the board. Accordingly, the lighting of at least one lamp during a test denotes the presence of at least one defect in the board under test.

The system of the instant invention is able to verify, by itself, whether it is operating correctly. In the absence of a program card all contact $CE_i$ are closed and, therefore, at each point P of all comparators a binary 0 input signal is represented. If no board is plugged into connector CS, all of pins $S_i$ are isolated, which is equivalent to a binary 1 signal on each such pin. With no program card and no board under test, all of switches $CM_i$ are set to the U position (output) and key ST is depressed. Thus, the binary 0 signal at point P of each comparator is compared with the binary 1 signal at each pin $S_i$. Because the logical values of these two signals for each comparator are unlike, all lamps should light. If all lamps are lighted, this test verifies the following: that all contacts $CE_i$ make good electrical connection when closed; that all lamps $LS_i$ are in operating condition; and that the logical portions of this system operate correctly in conditions wherein the binary values of the signals at point P and at corresponding pins $S_i$ are unlike.

Next, with the program card and board under test still absent, all of switches $CM_i$ are set to the I position (input). As described previously, with a switch $CM_i$ in the I position signals having like binary values are applied to input leads *a* and *b* of circuit 56, the output signal of the corresponding comparator $DC_i$ represents a binary 0, and the corresponding lamp $LS_i$ is extinguished. Therefore, with all switches $CM_i$ in the I position, all lamps should be extinguished after key ST is depressed. This second step in the test of the operating condition of the system verifies, if all lamps are extinguished, the correct operation of both positions of switches $CM_i$ and the correct operation of the logical portions of the system in conditions wherein the binary values of the signals at point P and at the corresponding pin $S_i$ are alike.

The system of the invention is also able to provide information identifying the proper position for each of switches $CM_i$ for each type of board to be tested. The program card corresponding to the type of board under test is inserted in the reading device until a designated row 0 is in position to activate the row of contacts $CE_1$ – $CE_{30}$ (the significance of row 0 on the program card will be described hereinafter). Row 0 on the program card provides information in binary form which identifies those terminals of of the board under test which are input terminals and those which are output terminals. In row 0 of the program card, prominences are located in each column which corresponds to an output terminal of the board under test.

When row 0 of the program card is in reading position in the reading device, those of contacts $CE_i$ which are to be associated with output terminals of the board under test are open and deliver binary 1 signals at the corresponding points P of the comparators, whereas those of contact $CE_i$ which are to be associated with input terminals are closed and deliver binary 0 signals at the corresponding points P. Now, with the board to be tested still not plugged into connector CS, all of switches $CM_1$ – $CM_{30}$ are set to the U position (output). Therefore, the binary value existing at point P of each comparator will be compared with the binary 1 provided from each isolated pin $S_i$. When key ST is depressed, each of the lamps $LS_i$ lights for which the signal at the corresponding comparator point P has a binary value differing from that at the corresponding pin $S_i$; i.e., for each point P having binary 0. Accordingly, those of lamps $LS_i$ which light are those corresponding to "input" indicia on row 0 of the program card. The $CM_i$ switches which correspond to the lighted lamps are now set to the I position. Now, if key ST is depressed once again, all lighted lamps will be extinguished.

However, there is one disadvantage of the above described method of setting switches $CM_i$ to correspond to the input and output terminals of the board to be tested. If one of the switches $CM_i$, which is to be associated with an output terminal of the board under test, is erroneously set to the I position at the time row 0 is first read, the corresponding lamp $LS_i$ will not light. This is because, as described previously, with any switch $CM_i$ in the I position the corresponding lamp $LS_i$ does not light when key ST is depressed. To obviate this disadvantage, the modified circuit of FIG. 7 may be adapted.

Figure 7:
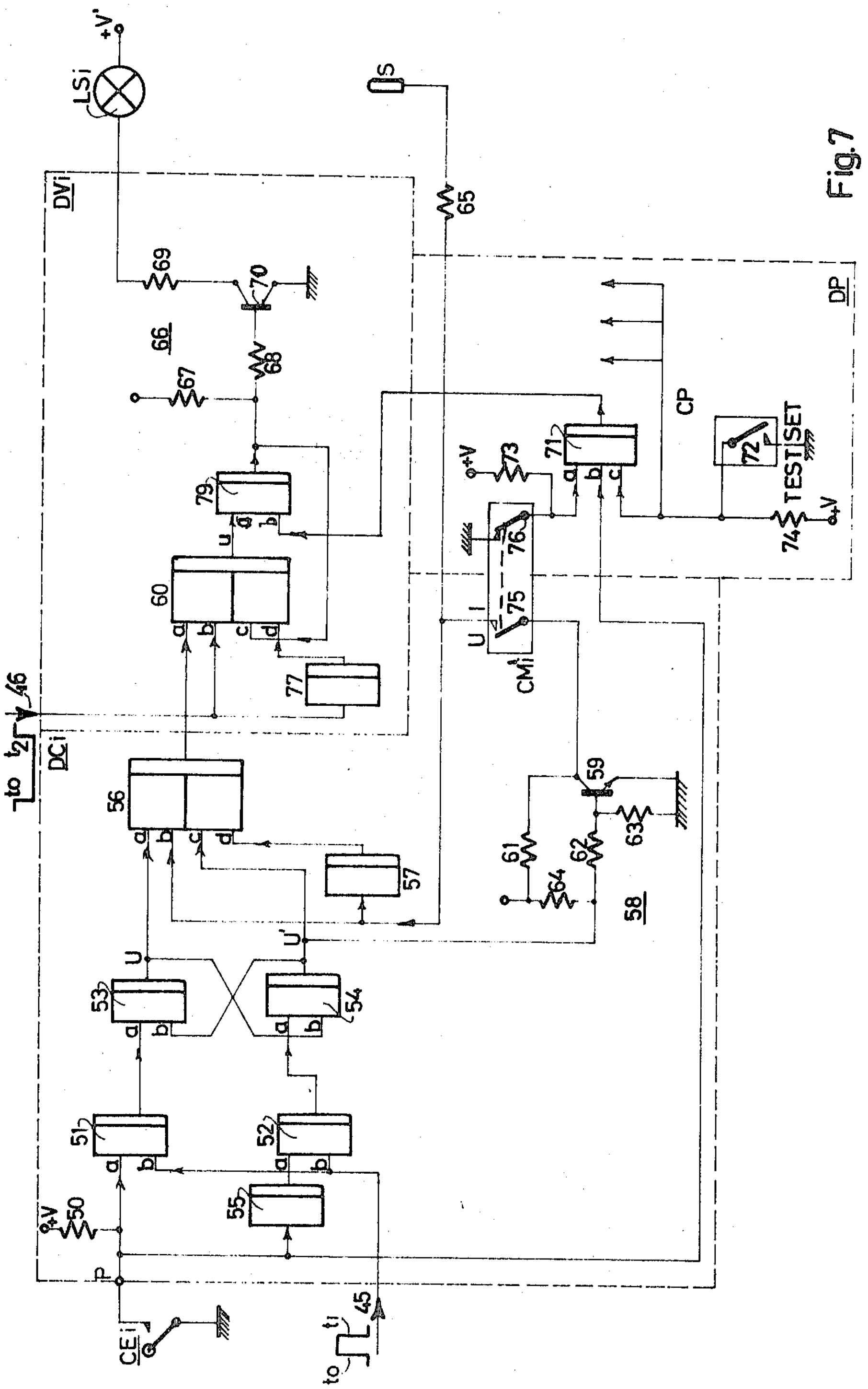
FIG. 7 is a block diagram of a modified form of the comparator and evaluator of FIG. 6.

The circuits of FIG. 7 are similar to those of FIG. 6, with the primary exception that a switch setting circuit DP, shown generally in FIG. 3, has been added. Switch setting circuit DP comprises a single switch CP, having a movable contact 72 operative between a closed test position and an open set position; additional contacts 76 which are parts of each switch $CM_i$, each contact 76 being ganged to the corresponding contact 75 and closed in the U position (output) and open in the I position (input); and a NAND circuit 71 for each evaluator $DV_i$. Additionally, in each evaluator the NOT circuit 78 has been replaced by a NAND circuit 79.

During the normal test operation of the system, switch CP is in the TEST position. The movable contact of switch CP is connected to input lead *c* of circuit 71 and the fixed contact of switch CP is connected to ground. Therefore, in the TEST position, switch CP delivers a binary 0 signal to input lead *c* of NAND circuit 71. Circuit 71 upon receiving the binary 0 signal from switch CP, delivers an output signal representing a binary 1.

The output signal of circuit 71 is coupled to input lead b of circuit 79. The output signal of AND-OR-NOT circuit 60 is coupled to input lead *a* of circuit 79. Accordingly, when switch CP is in the TEST position and circuit 79 receives a binary 1 on lead b thereof, circuit 79 always inverts the binary sense of the signal applied to its input lead *a*. Thus, with switch CP in its TEST position, NAND circuit 79 always functions as a NOT circuit, whereby operation of the comparator-evaluator combination of FIG. 7 is the same as that described previously in connection with FIG. 6. Lead *c* NAND circuit 71 is also connected to the positive source, =V, through a resistor 74. Therefore, when switch CP is in the TEST position, a binary 0 is applied to input lead c of circuit 71, but when switch CP is in the SET position, a binary 1 is applied to lead *c*.

Input lead *b* of circuit 71 is connected directly to point P of contact $CE_i$. As described previously, when row 0 of the program card is being read, point P provides a binary 0 signal when the corresponding board terminal is an output terminal. Input lead a of circuit 71 is connected to contact 76 of switch $CM_i$ and to the source, +V, through a resistor 73. When contact 76 is in the U position (output) it rests against a fixed contact which is connected to ground and, therefore, delivers a binary 0 signal to input lead a of circuit 71. However, when contact 76 is in the I position (input) it delivers a binary 1 signal to lead *a*.

The operation for setting switches $CM_i$ using the circuit of FIG. 7 will now be described. The program card is inserted into the reading station with row 0 thereof in the reading position. No board is plugged into connector CS. Switch CP is placed in the SET position and all of switches $CM_i$ are placed in the I position (input). Input lead c of NAND circuit 71 now receives a binary 1 signal from switch CP and input lead a receives a binary 1 signal from the open contact 76.

With switch CP in the SET position, and with all of switches $CM_i$ in the I position, the output signal delivered by each NAND circuit 71 depends upon the binary value of the signal received on the respective input lead *b* thereof. If point P delivers a binary 0, denoting that the corresponding board terminal is to be an input terminal, NAND circuit 71 delivers a binary 1 output signal. As described previously, when NAND circuit 71 delivers a binary 1 output signal to NAND circuit 79, the evaluator operates normally. However, as described previously, whenever a switch $CM_i$ is in the I position, the corresponding comparator $DC_i$ delivers a binary 0 output signal and the associated lamp $LS_i$ does not light. Consequently when point P denotes an input terminal, the lamp $LS_i$ does not light upon the depression of key ST, which signifies that the corresponding switch $CM_i$ is in the correct position, which is the I position.

If point P delivers a binary 1, denoting that the corresponding board terminal is to be an output terminal, NAND circuit 71 delivers a binary 0 output signal because all three of its input signals represent binary 1's. When NAND circuit 79 receives this binary 0 output signal of circuit 71, it delivers a binary 1 output signal regardless of the binary value of the signal received from circuit 60. Therefore, the corresponding lamp $LS_i$ will light. Each of the lamps $LS_i$ which lights signifies that the corresponding switch $CM_i$ is in the wrong position. Therefore, all switches $CM_i$ which correspond to lighted lamps are now transferred to the U position (output).

With a switch $CM_i$ in the U position, input lead a of NAND circuit 71 receives a binary 0, and the output signal of circuit 71 is a binary 1, enabling the corresponding evaluator $DV_i$ to be operative. If, now, key ST is depressed again, comparators $DC_i$ receive a binary 1 signal from the point P which corresponds to the $CM_i$ switches which have been transferred to the U position and receive a binary 1 from the corresponding $S_i$ pin. Accordingly, each of the lamps associated with the output position will be extinguished, all lamps will now be unlighted and all switches $CM_i$ are in the correct position.

If one of switches $CM_i$ which is associated with an input terminal is mistakenly set originally to the U position, when the key ST is first depressed, the comparator $DC_i$ will receive a binary 0 signal from the corresponding point P and a binary 1 signal from the corresponding point $S_i$, and the corresponding lamp $LS_i$ will light, signifying that the corresponding switch $CM_i$ is in the wrong position.

Figure 8:
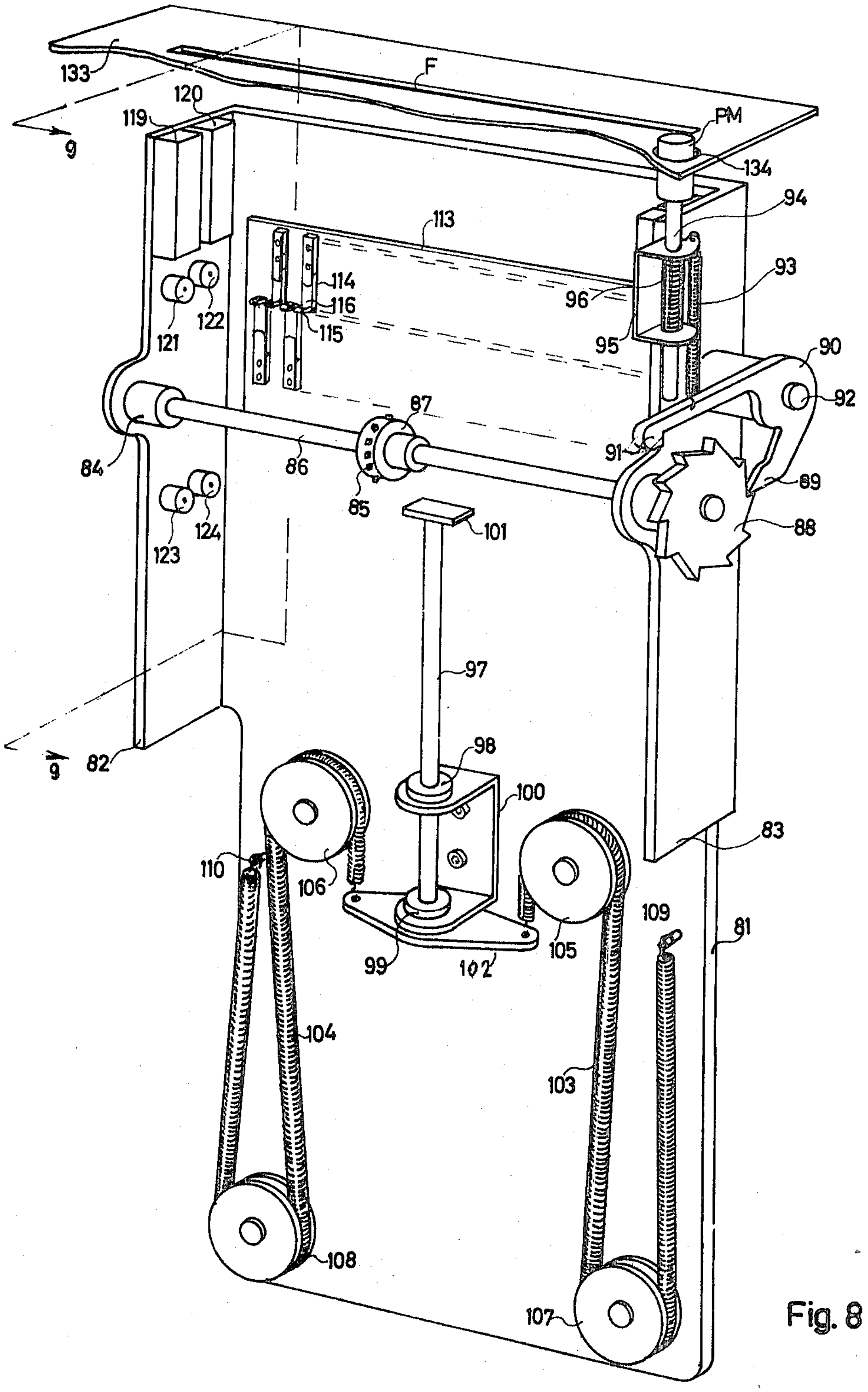
FIG. 8 is a simplified perspective view of a program reading device used with the embodiment of FIG. 3.

The mechanical device for reading the program card is represented in a simplified way in FIG. 8. It comprises a supporting plate 81 provided with two lateral ribs 82 and 83, each of which carries a bearing, such as the bearing 84. These two bearings, support a shaft 86 for rotation. A pin wheel 87, preferably of a plastic, such as nylon or a similar material is provided with peripheral pins 85. Wheel 87 is fixed to shaft 86 in a substantially central position relative to plate 81. A ratchet wheel 88, having teeth equal in number to the number of pins on wheel 87, is fixed to shaft 86 externally of rib 83.

The teeth of ratchet wheel 88 cooperate with rocking lever 90, which is provided with teeth 89 and 91. Lever 90 is free to oscillate under the action of a spring 93 around a pivot 92, which is mounted on the external face of rib 83. The horizontal arm of rocking lever 90 is controlled by the action of the lower end of a cylindrical rod 94, which is free to slide through holes in a U-shaped guide 95. Guide 95 is mounted on the external face of rib 83. Rod 94 is urged into an upper position by the action of a compression spring 96, as shown.

The upper end of rod 94 is extended beyond the upper extremity of plate 81 and is covered with plastic material, thus forming a push button PM. Bottom PM is hand-operated for controlling the step-by-step advancement of the program card. Push button PM passes through a hole 134 in a cover plate 133. Plate 133 may preferably form the upper cover of the system chassis.

Near the vertical center line of plate 81, below pin wheel 87, a piston 97 is arranged for sliding through two guide bearings 98 and 99, carried by the U-shaped guide 100. Guide 100 is mounted on plate 81. The upper end of piston 97 supports a T-shaped member 101, which has an upper plane horizontal surface on which the lower edge of the program card rests. A crossbar 102 is mounted on the lower end of the piston 97, and two springs 103 and 104 are each hooked to the lateral ends of this crossbar.

Spring 103 and 104 are wound around respective first rollers 105 and 106 and respective second rollers 107 and 108. Springs 103 and 104 are hooked to respective studs 109 and 110, which are mounted on plate 81. Rollers 105, 106, 107, and 108 rotate freely around respective pivots, fixed to play 81. Springs 103 and 104 urge piston 97 to its extreme upper position to travel. Because the length of each of springs 103 and 104 is substantially greater than the travel distance of piston 97, the force applied by these springs to the piston is substantially equal at all points of piston travel.

Above shaft 86 an insulating strip 113, which is fixed to plate 81, extends across the width of the plate. Groups of contact spring sets 114 comprising contact $CE_i$ – $CE_{30}$ are mounted along strip 113. Each spring set 114 is provided with a small roller 115 carried by an elastic leaf 116 (shown more clearly in FIG. 9). A spring set 114 is displaced from its rest position when its roller 115 comes in contact with a prominence carried by the program card. The displacement of roller 115 forces an underlying electrical contact to open. All of rollers 115 are located along a straight horizontal line.

Two rectangular guide blocks 119 and 120, of a suitable plastic material such as nylon, are mounted on the inner upper part of rib 82 with a narrow slit between them, the slit having a width slightly greater than the thickness of the program card to form a guiding passage when the card is introduced into a slit F in plate 133. In a lower position, at a suitable distance, this guiding passage is completed by the pair of rollers 121 and 122 and the pair of rollers 123 and 124. The rollers of each pair are spaced apart by a distance corresponding to the thickness of the metal card. A similar guiding passage is provided by a pair of blocks and two pairs of rollers located on the internal side of the rib 83, not shown in FIG. 8 drawing.

Figure 9:
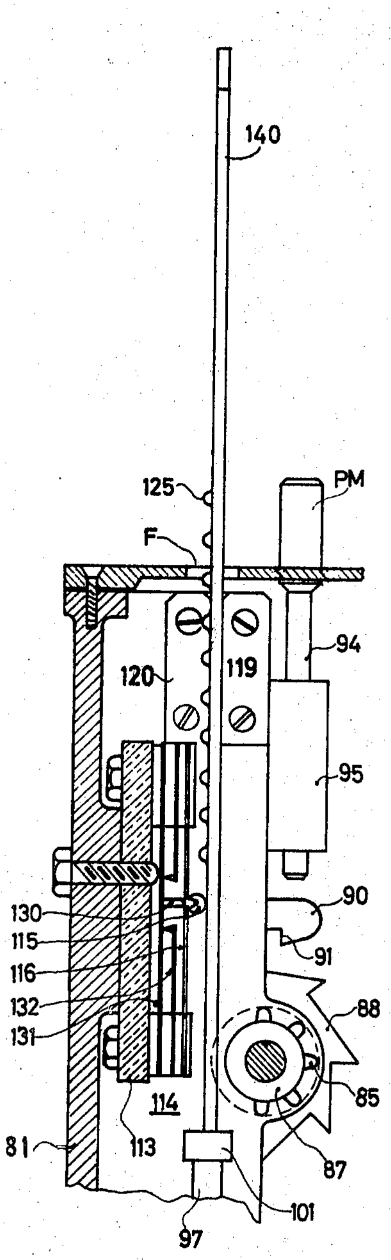
FIG. 9 is a sectional view of the reading device of FIG. 8.
Figure 10:
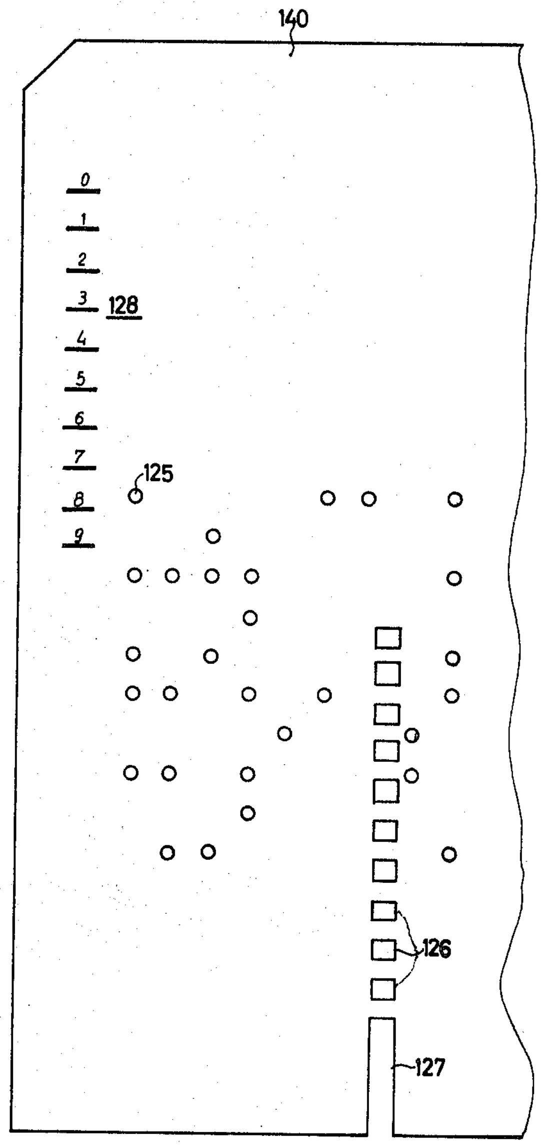
FIG. 10 illustrates a portion of a program card for use in the present invention.

FIG. 9 illustrates further details of the reading device of FIG. 8, and FIG. 10 illustrates a portion of a program card. The program card is formed as a metallic plate 140, substantially rectangular in shape. The program card is preferably of aluminum, with a thickness, for example, of 1.5 mm. Prominences 125 are selectively disposed at the intersections of the rows and columns of a geometrical matrix arranged on the program card. These prominences, which are obtained by cold-drawing the aluminum plate, protrude from the plate surface which faces the spring set 114. The prominences are approximately hemispherical in shape and have a height of approximately 1.7 mm.

Along the vertical centered line of plate 140, between two adjacent columns, and in a position which does not interfere with the function of the prominences, a plurality of equispaced rectangular openings 126 are provided. The spacing between opening 126 is equal to the distance between rows of prominences. The pins 85 of pinwheel 87, FIG. 9, engage openings 126. Below the column of openings 126 an elongated slit 127 is provided, which extends to the lower edge of plate 140. Slit 127 permits the program card to rest on the T - shaped member 101 without being engaged by the pins 85 of pinwheel 87.

The program card also carries a set of graduations 128, which comprises equally spaced lines progressively numbered from the top down. These graduations permit the operator to know, in any position of the program card, which row is in the reading position.

The program card is inserted into slit F and between guide blocks 119 and 120 and is then dropped until its lower edge rests on member 101. Upon pressing the program card downward, against the resistance of springs 103 and 104, the openings 126 engage the pins 85 of pinwheel 87, forcing pinwheel 87 to rotate counterclockwise as shown by FIG. 9. Ratchet wheel 88 is also forced to rotate, its rotation being permitted because of the proper slope of the sides of its teeth. As wheel 88 rotates, rocking lever 90 oscillates around its pivot 92.

At the lower end of travel of piston 97, the program card is in such a position where that the upper row, row 0, of prominences 125 controls the spring sets 114 through rollers 115. Each roller 115 corresponds to a column of prominences 125. If a roller 115 is engaged by a prominence 125, the roller which is carried by elastic leaf 116, is pushed to the left, FIG. 9. When a roller 115 moves to the left, it forces an insulating block 130 and a contact spring 131 on which block 130 is mounted to move to the left. Contact spring 131 is thereby moved away from the associated contact spring 132, opening the connection between contact springs 131 and 132. If there is no prominence opposite a roller 115, the corresponding contact spring set remains closed.

When row 0 of the prominences are in position to control spring set 114, the upper horizontal line of the graduations 128, numbered 0, is level with the cover plate 133. The operation of setting switches $CM_i$ to the U or I positions is carried on with the card in this "0" position. After switches $CM_i$ have been set, push button PM is pressed. The lower end of rod 94 thereupon depresses the horizontal arm of the rocking lever 90, whereupon tooth 89 releases the engaged tooth of ratchet wheel 88. Under the urging of springs 103 and 104, acting through the program card and pinwheel 87 mounted on shaft 86, ratchet wheel 88 rotates clockwise for half a pitch, FIG. 9. When push button PM is released, ratchet wheel 88 rotates through the next half-pitch and is restored to its rest position, wherein tooth 89 of the rocking lever engages with the vertical side of the following tooth of the ratchet wheel. Thus the card advances upwardly, and the next following row of prominences is in the read position.

Each time button PM is depressed, the card is advanced another row. Therefore, by alternately operating button PM and key ST, a complete analysis of the board under test is made.

Figure 11:
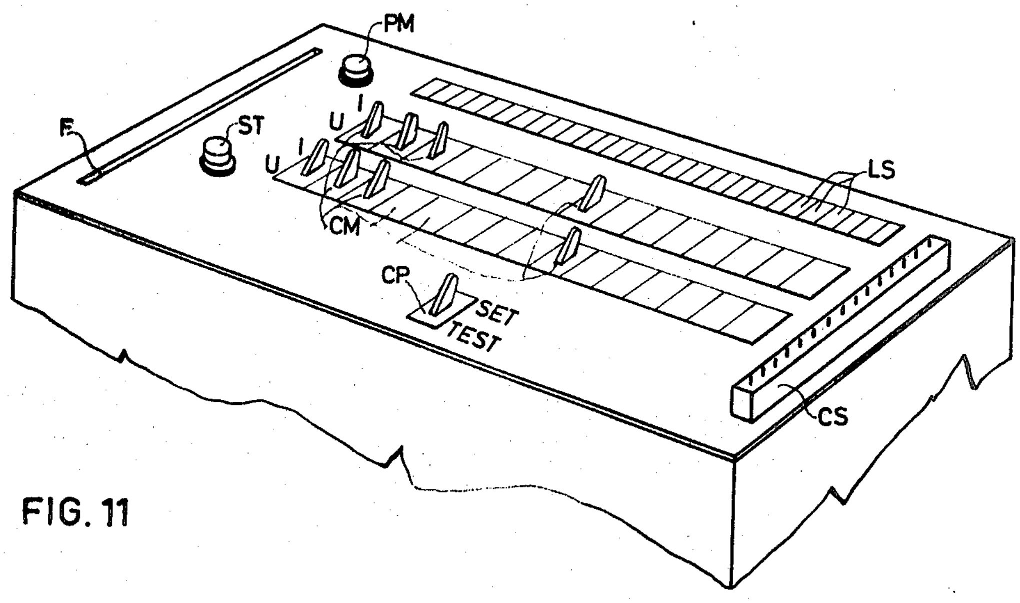
FIG. 11 is a perspective view of a chassis suitable for housing the components of the present invention.

FIG. 11 illustrates one arrangement of the different components of the invention mounted on a chassis. The top of the chassis comprises cover plate 133. The program card is inserted into the slit F on the left and pushed down as far as possible; in this position it is in "0" position.

The switch CP is placed in the SET position and switches $CM_i - CM_{30}$ are set to the proper positions as described previously. Next the board to be tested is plugged into the multiple pin connector CS, and switch CP is transferred to the TEST position. Now button PM and key ST are alternately operated. Button PM advances the program card from one reading position to the next and key ST activates the corresponding test step. The operator must note which lamps light at each test stop. At the end of the operation, it can be determined from the pattern of the lamps lighted by the given test steps which integrated circuit unit is defective, by consulting a prepared list for correspondence between the patterns of the lighted lamps and known patterns which occur for certain defects.

This correspondence list may be obtained by known means, for example, by physically preparing possible defects and experimentally determinating the test patterns which can detect the defects and the recording differences between correct output signals and actual output signal. Another method for obtaining such a list is to use an electronic computer programmed to simulate the circuit of every card, and simulating by program all possible failures in order to obtain a list of the differences between possible output signal patterns and the correct output patterns. A diagnostic program can be used which is capable of detecting the possible failures.

The location of the prominences on the program card is easily determined when the succession of input signal patterns for a given circuit board has been prepared and the correct corresponding output signal patterns have been determined.

The list of discrepancies between correct output signal patterns and possible failure output signal patterns, for each test input signal pattern, and the list of the failures causing such discrepancies are tabulated to set up the correspondance list to be consulted by the operator.

It should be understood that the foregoing disclosures relate only to a preferred embodiment of the invention and that within the scope of the invention are all changes and modifications of the embodiment which do not constitute departure from the true spirit and scope of the invention. For example, the reading contacts may be operated by depressions or holes in the card, instead of prominences; the contacts themselves may be simply metal springs so arranged as to establish electrical connections with a conductive surface on the program card, such connections being selectively interrupted by covering the card in selected regions with an insulating layer.

Moreover, the reading of the card may be effected by photoelectric means, by providing a proper source of light on one side of the card, a plurality of photosensitive elements, such as, photodiodes, photoresistors, etc., on the opposite side, and by providing the card with openings in selected positions; whereby, at each reading position only these photosensitive elements which are opposite to the openings receive light. In this form, the program card may be replaced by a photographic plate on which a suitable pattern of transparent and opaque regions have been formed.

We claim:

1. A system for testing digital electric circuits having input terminals to receive input signal patterns and output terminals to deliver output signal patterns wherein a predetermined succession of test signal patterns is applied to the input terminals of a circuit under test and wherein each of the output signals patterns at the output terminals of said circuit is compared with a simulation signal pattern comprising:

a. a system terminal for each input and output terminal of the circuit under test, b. a plurality of comparing means, one for each system terminal, having first and second inputs to receive binary signals to be compared, a third clock input, a first output signal dependent on a comparison result upon reception of a clock signal and second output showing a binary signal equal to the one received at the first input, c. a plurality of displaying means responsive to output signals from said comparing means for displaying the result of said comparison, d. a support member bearing indicia representing said succession of test signal patterns and said simulation signal patterns, e. reading means to read out said indicia and to deliver a succession of test signal patterns and simulation signal patterns to the first inputs of said plurality of comparing means, f. timing means to deliver a clock signal to said third clock inputs of said plurality of comparing means, g. means for connecting each second input of said plurality of comparing means to a respective system terminal, and h. switching means to selectively connect selected ones of said system terminals corresponding to input terminals of the circuit under test with corresponding second outputs of said comparing means, whereby test signal patterns are applied to the input terminals of the circuit under test through selected ones of said switching means and output patterns are delivered to said comparing means through selected ones of said connection means.

2. The system of claim 1, wherein said support member comprises a substantially rigid card provided with said indicia arranged in a geometrical matrix, each column of said matrix corresponding to one of said comparing means.

3. The system of claim 1 wherein said displaying means further comprise a timing input to display a comparison result only upon reception of a timing signal and wherein said timing means further delivers a timing signal to said displaying means.

4. The system of claim 1 wherein said support member further bears indicia giving a representation of the test input terminals and the output terminals of the circuit under test thus providing the system with self setting capability by means of said displaying means, said comparing means and said connection means comprised in the system.

* * * * *